(12) United States Patent
Sevilleja et al.

(10) Patent No.: US 6,193,026 B1
(45) Date of Patent: Feb. 27, 2001

(54) ELEVATOR BRAKE

(75) Inventors: Jose Sevilleja; Armando Servia, both of Madrid (ES)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 08/995,797

(22) Filed: Dec. 22, 1997

(51) Int. Cl.[7] ................................ B66B 1/32; B60T 11/10
(52) U.S. Cl. ....................... 188/153 R; 187/288; 187/351
(58) Field of Search ........................... 187/275, 288, 187/349, 351, 359, 373, 374, 376, 409, 72.3; 188/156, 158, 161, 163, 170, 182, 184, 187

(56) References Cited

U.S. PATENT DOCUMENTS

| 5,014,828 | * | 5/1991 | Baldassarre ........................ 188/173 |
|---|---|---|---|
| 5,265,701 | * | 11/1993 | Ogasawara et al. .................. 187/38 |
| 5,648,644 | * | 7/1997 | Nagel ................................ 187/288 |
| 5,739,610 | | 4/1998 | Nemoto et al. . |

FOREIGN PATENT DOCUMENTS 0183616   6/1986   (EP) .

* cited by examiner

Primary Examiner—Chris Schwartz

(57) ABSTRACT

An elevator brake includes a fluid enclosure that provides a force to counter a braking force. In a particular embodiment, the fluid enclosure functions as a fluid pressure amplifier between a controllable actuator and a braking surface. The fluid enclosure increases the force of the actuator such that smaller, more controllable actuators may be used to control the brake.

33 Claims, 4 Drawing Sheets

ELEVATOR BRAKE

TECHNICAL FIELD

The present invention relates to elevators, and more particularly to brakes for such elevators.

BACKGROUND OF THE INVENTION

A typical traction elevator includes a car, a counterweight, and a plurality of ropes interconnecting the car and counterweight. The ropes are engaged with a traction sheave that is rotated by a machine. Rotation of the traction sheave moves the car and counterweight through the hoistway.

In order to prevent the car from over-speeding in the downward direction, the car includes a safety device that is triggered by a governor. In a conventional configuration, if the car begins to travel faster than a predetermirned speed, the governor will cause a lift rod to be lifted relative to the car. As the lift rods are lifted, a pair of wedge shaped blocks are pulled into contact with the guide rail for the car. Friction between the guide rail and the wedge shaped blocks pulls the blocks into further engagement with the guide rails and thereby results in the application of a braking force to bring the car to a safe stop.

Such safety devices have proven reliable through use. A drawback to such devices, however, is that they work in only one direction, typically the down direction for the car. It is now desirable to prevent an over-speed condition from occurring in the up direction of the car as well. A simple solution to this problem is to install safety brakes on both the car and the counterweight. This solution may be expensive due to the doubling of the number of safety brakes.

Another possible solution is to place a spring-loaded brake on the car that stops the movement of the car in either the up or down direction. Due to the loads involved, this requires significant braking force between the braking surface and the guide rail and therefore the spring must be large enough to provide an adequate amount of force. A more significant problem is that during normal operation, the braking force of the safety brake must be removed to permit the car to travel through the hoistway. The removal of the braking force requires a device that applies an opposing force to overcome the force applied by the spring. In addition, the means to apply an opposing force should permit the spring to apply a braking force in the event of a loss of power. A possible solution is to provide an electro-magnetic device, such as a solenoid, that counters the braking force when power is applied to the coil of the solenoid. Unfortunately, the forces required result in a large, heavy solenoid and a require a significant amount of power. Therefore, such a configuration is not practical.

The above art notwithstanding, scientists and engineers under the direction of Applicants' Assignee are working to develop improved braking systems for elevators.

DISCLOSURE OF THE INVENTION

According to the present invention, a brake for a passenger conveyor includes a fluid enclosure, wherein the fluid pressure within the enclosure counters the braking force generated by a biasing means. The use of the fluid enclosure provides a simple and effective means to remove the braking force, while permitting the braking force to be applied quickly if the need arises.

In a particular embodiment, the enclosure is a fluid pressure amplifier disposed between an actuator and a braking surface. The fluid pressure amplifier increases the force of the actuator that opposes the braking force.

As a result of the fluid pressure amplifier, the actuator may be smaller relative to the size of the means biasing the braking surface to brake the passenger conveyor. Smaller actuators provide a more compact brake system and require less power in order to be actuated. This is particularly advantageous for passenger conveyors, such as elevators, which need compact and lightweight devices. In addition, since less power is needed to overcome the braking force, greater braking force may be applied to the braking surface. This feature permits the brake to be used as a bidirectional safety brake for an elevator.

In a particular embodiment, the braking surface is disposed on a piston including a flange having a surface area A1. The fluid pressure amplifier is defined by a sealed enclosure containing a fluid, and wherein the sealed enclosure includes an inner wall defined in part by the flange. The enclosure also includes a branch that extends to the actuator. The actuator includes another flange with a surface area A2, wherein A2<A1. This surface defines a portion of the inner surface of the branch. Movement of the actuator applies a force on the fluid that urges the piston flange to move the braking surface and reduce the braking force.

In another particular embodiment, the fluid enclosure is in communication with an accumulator and a pressure relief valve. The accumulator provides a source of stored, pressurized fluid to the enclosure through an operation valve. The pressure relief valve provides means to release the pressure within the enclosure and thereby permit the brake to stop the elevator car.

According to a further embodiment of the present invention, a brake for a passenger conveyor includes a braking surface, biasing means that applies a braking force to the braking surface, a controllable actuator engaged with the braking surface to apply a second force opposing the force of the biasing means, and a controller that controls the position of the actuator. The controller receives inputs from the passenger conveyor that provide information on the position of the passenger conveyor car. The controller positions the actuator to permit movement of the car until the car reaches a desired location.

In a particular configuration of this embodiment, the controller further receives inputs that provide information on the car speed. The controller positions the actuator to limit the speed of the car to less than a predetermined speed.

As a result of the features of this embodiment, the brake may be used to permit movement of the passenger conveyor car in the event of a shut-down of the passenger conveyor. The controller, which may be powered by a back-up power source, provides variable power to the actuator such that the removal of braking force is controlled, and thereby the speed of the car is controlled. The controller monitors the position and speed of the car and maintains the power to the actuator until the car arrives at a landing. Once the car is at the desired landing, the controller removes power from the actuator and the biasing means applies sufficient force to stop the movement of the car At this point, passengers in the car may safely exit the car.

The foregoing and other objects, features and advantages of the present invention become more apparent in light of the following detailed description of the exemplary embodiments thereof, as illustrated in the accompanying drawings.

BEST MODE FOR CARRYING OUT THE INVENTION

Figure 1:
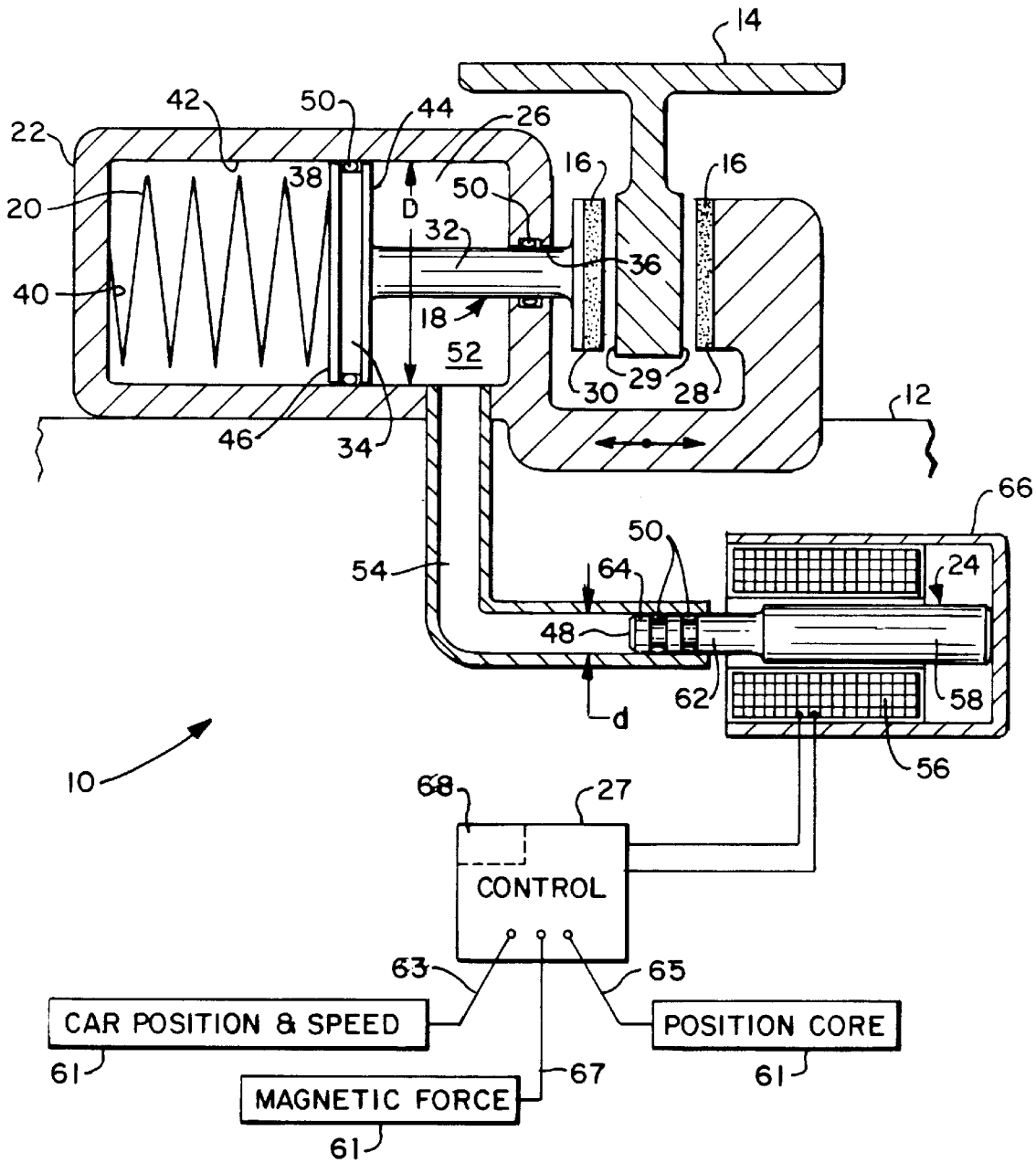
FIG. 1 is a schematic representation of an elevator safety brake according to the present invention.

Illustrated in FIG. 1 is an elevator safety brake assembly 10. For clarity purposes, only one safety brake 10 is shown, although it should be understood that in typical elevator systems there are two safety brakes, one for each guide rail. The safety brake assembly 10 is disposed on an elevator car 12 and is proximate to one of the guide rails 14 for the elevator car 12. The safety brake assembly 10 includes brake pads 16, a piston 18, a spring 20, a frame 22, an actuator 24, a sealed enclosure 26, and a control system 27.

The two brake pads 16 are disposed on opposite sides of the guide rail 14 and in close proximity to contact surfaces 29 of the guide rail 14. The brake pads 16 define braking surfaces for the elevator car 12 and the contact surfaces 29 define complementary surfaces to engage the braking surfaces. The first pad 28 is attached to the frame 22 and the second pad 30 is attached to the piston 18 for movement with the piston 18. Upon sufficient movement of the piston 18 towards the guide rail 14, the pad 30 engages the proximate contact surface 29 of the guide rail 14 and, in reaction, the other pad 28 engages the contact surface 29 on the opposite side of the guide rail 14. The engagement between the pads 28,30 and the guide rail 14 produces a braking force on the elevator car 12.

The piston 18 includes the pad 30, a shaft 32 and a flange 34 disposed on the opposite end of the shaft 32 from the pad 30. The shaft 32 is retained within an aperture 36 in the frame 22 for longitudinal movement toward and away from the guide rail 14. The flange 34 is engaged with one end 38 of the spring 20 such that the spring 20 applies a force urging the piston 18 toward the guide rail 14.

The spring 20 is retained within the frame 22 and has one end 38 that is engaged with the flange 34 and the opposite end 40 that seats against the frame 22. The spring 20 defines a biasing means that, in its installed position, is compressed such that it applies a force against the flange 34. The magnitude of the force applied is predetermined to be sufficient to engage the brake pads 16 with the guide rail 14 and to stop the movement of the elevator car 12 within a predetermined safe distance and/or time.

The sealed enclosure 26 contains a fluid, such as oil, and is defined by the inner surfaces 42 of the frame 22, the surface 44 of the flange 34 that is opposite to the surface 46 engaged with the spring 20, and a surface 48 disposed on the actuator 24. The sealing characteristic of the enclosure 26 is maintained by a plurality of seal means 50, such as O-rings, disposed about the shaft 32, the flange 34, and the actuator 24. The sealed enclosure 26 includes a first volume 52 that is defined primarily by the surfaces 42,44 of the flange 34 and frame 22, and a second volume or branch 54 that is defined by the surfaces 42,48 of the frame 22 and actuator 24. The cross-sectional area A1 of the first volume 52, as measured parallel to the surface 44 of the flange 34, is significantly larger than the cross-sectional area A2 of the branch 54, as measured parallel to the surface 48 of the actuator 24. As shown in FIG. 1, both the first volume 52 and the branch 54 have circular cross-sections and therefore the area is proportional to square of the magnitude of the diameters D,d for the first volume 52 and branch 54, respectively ($A1=(\pi/4) \times D^2$ and $A2=(\pi/4) \times d^2$).

The actuator 24 is the movable core 58 of an electromagnetic device, such as a solenoid, that includes a coil 56. The electromagnetic device defines means to control the position of the actuator 24. The coil 56 is connected to the control system 27 that provides electrical power to the coil 56. When powered, the coil 56 generates a magnetic field about the core 58 and urges the core 58 to move toward the sealed enclosure 26. The magnitude of the magnetic force generated by the coil 56 is dependant upon the magnitude of the power supplied to the coil 56. As a result, the force applied by the actuator 24 to the fluid within the sealed enclosure 26 is variable and, along with the position of the actuator 24, is controllable by the control system 27.

The core 58 includes an extension 62 which is engaged with seal means 50 and includes a flange 64 having the surface 48 disposed thereon. Fluid pressure within the sealed enclosure 26 generates a force on the surface 48 that urges the core 58 to move outward, away from the sealed enclosure 26 and opposite to the direction urged by the magnetic forces on the core 58. The actuator also includes a stop 66 that limits the outward movement of the core 58 resulting from pressure on the surface 48.

The control system 27 receives sensor inputs 61 that provide information on the elevator car 12 position and speed 63, position 65 of the core 58, and the magnetic force 67 applied by the coil 56 to the core 58. The control system 27 analyzes these sensor inputs 63,65,67 to determine the amount of power to provide to the coil 56 to move the core 58.

During operation of the elevator car 12 under normal conditions, sufficient power is provided by the control system 27 to the coil 56 to apply a force on the fluid within the sealed enclosure 26 such that the brake pads 16 are separated from the surfaces 29 of the guide rail 14. As a result of the configuration illustrated in FIG. 1, the magnitude of the force required to be applied to the fluid by the actuator 24 is small relative to the force applied to the piston 18 by the spring 20.

For example, if the diameter D of the first volume 52 is four times as large as the diameter d of the branch 54, then the force applied to the actuator 24 needs to be only one-sixteenth of the force applied to the piston 18 by the spring 20 in order to equalize forces. This results from the force on the surfaces 44,48 being the product of the pressure P within the sealed enclosure 26 multiplied by the area A1,A2 of the surfaces 44,48, which is (P×A1) for the surface 44 and (P×A2) for the surface 48 (assuming the surface areas are approximately equal to the cross-sectional areas of the first volume 52 and branch 54, respectively). Since the pressure P within the sealed enclosure 26 is constant throughout its volume, the ratio of forces on the surfaces 44,48 reduces to a ratio of the areas A1 and A2, or the square of the diameters D and d. In this example, D=4d and therefore a unit force F2 applied by the actuator 24 results in sixteen times that force (F1=16×F2) being applied to the flange 34.

Therefore, small forces applied by the actuator 24 may be used to overcome the large force applied to the piston 18 by the spring 20 and thereby maintain a separation between the brake pads 16 and the guide rail 14. In other words, the configuration of the sealed enclosure 26 acts as a fluid pressure amplifier in transmitting forces from the actuator 24 to the piston 18. The controllability and precision of the positioning and forces on the actuator 24 by the control system 27, and thereby of the safety brake 10, are enhanced by the minimal forces required to move the actuator 24.

When the car 12 is stopped, such as at a landing, the control system 27 reduces the power supplied to the coil 56. The reduction of power reduces the force F2 applied by the actuator 24 to the fluid and thereby permits the spring 20 to bias the brake pads 16 against the guide rail 14 to hold the car 12 at the landing. When it is desired to move the car 12 again, the control system 27 supplies sufficient power to the coil 56 to move the actuator 24 and lift the brake pads 16 from the guide rail 14.

If during the movement of the car 12, the control system 27 determines that the car 12 is traveling at an excessive speed, the control system 27 may reduce or remove power from the coil 56. This will cause the force of the spring 20 to urge the brake pads 16 against the guide rail 14 and to bring the car 12 to a safe stop. An example of this would be to use a governor (not shown) engaged with the car 12 to trigger the control system 27, and thereby, remove power from the coil 56.

If, on the other hand, power to the elevator system is interrupted such that its drive machine is no longer powered, this loss of power will also remove power from the coil 56. The spring 20 will bias the brake pads 16 against the guide rail 14 to stop any further movement of the car 12 until power is restored.

In some instances, it may be desirable to move the car 12 even if a shut-down of the elevator system has occurred. One such instance occurs when the elevator is shut-down and the car 12, including passengers, is stopped between landings. In order to evacuate passengers, it would be desirable to move the car 12 to the nearest landing. With the configuration illustrated in FIG. 1, this type of evacuation is possible.

Figure 2:
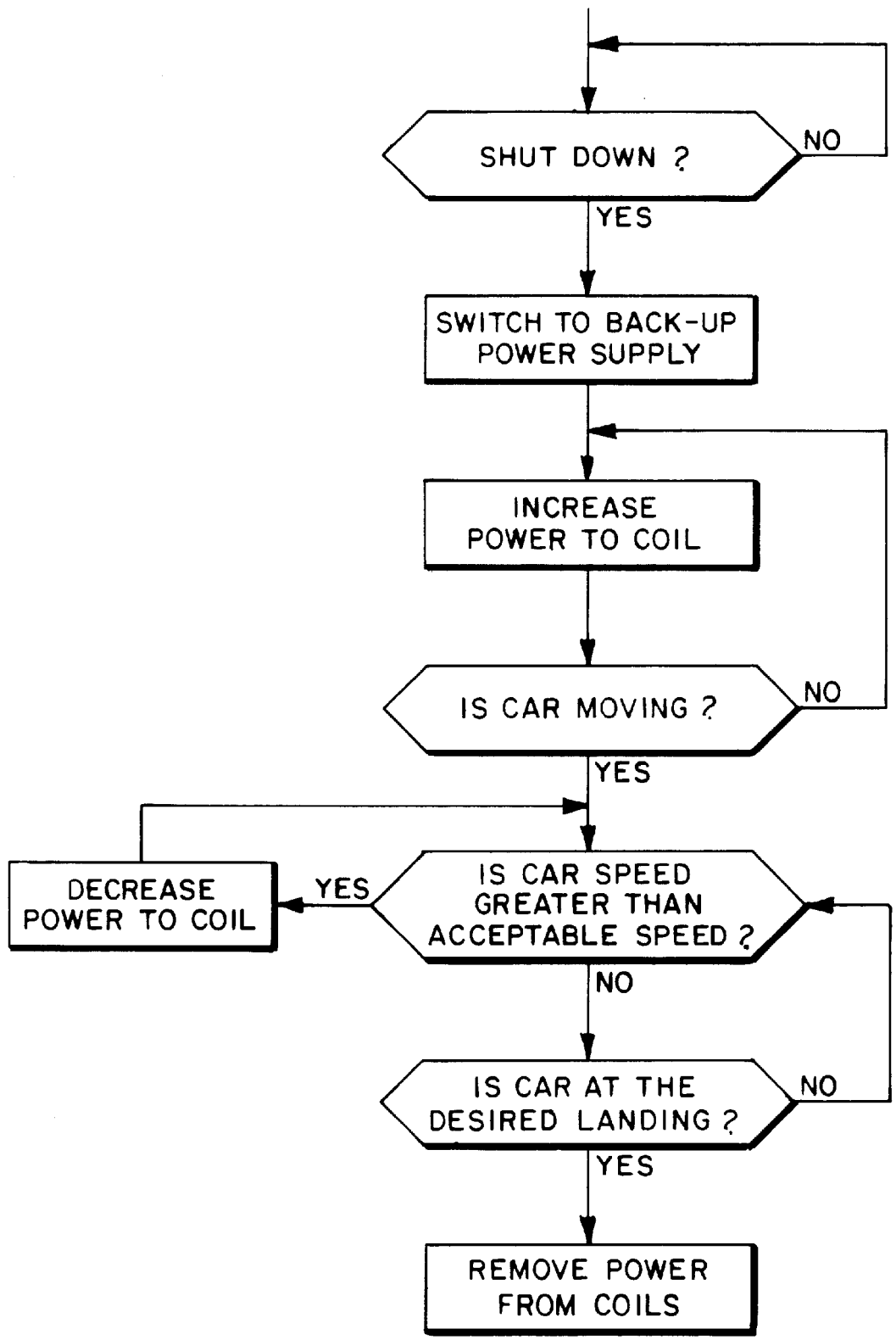
FIG. 2 is a functional flow diagram of a method to move an elevator car to a landing.

The control system 27 further includes a back-up power supply 68, such as a battery. In the event that power is interrupted, the back-up power supply 68 may be engaged to supply sufficient power to the control system 27 and actuator 24. The movement of the car 12 to the nearest landing is accomplished as shown in FIG. 2. First the back-up power supply 68 is connected to the control system 27. Next, the control system 27 supplies power to the coil 56 in small increments until the car 12 begins to move. The car 12 will move as a result of the imbalance that exists between the car 12 and passenger load and the counterweight load. The control system 27 then determines the direction of movement and the position of the car 12, via the sensor inputs 63, relative to the closest landing. The control system 27 also continually monitors the speed of the car 12 to ensure that controlled movement of the car 12 occurs. The ability to precisely control the forces applied by, and position of, the actuator 24 permits the control system 24 to accurately control the speed of the car 12. If the control system 27 detects that the car 12 is accelerating excessively, power to the coil 56 is reduced to increase the braking force applied by the brake pads 16 to the guide rail 14 and slow the movement of the car 12. Once the control system 27 detects that the car 12 is at the desired landing, power is removed from the coil 56 to permit the brake pads 16 to engage the guide rail 14 with sufficient force to stop further movement of the car 12.

As an alternative, the movement of the car to permit evacuation may be performed manually as opposed to the automated procedure described above. In this manner, a mechanic may engage back-up power to the actuator and may visually monitor the direction of movement and speed of the car. In another alternative, the control system may include a display that provides information to the mechanic on direction and speed and provides means to manually adjust the power supplied to the coil through the control system.

Although the actuator is shown and described as being the core of an electromagnetic device, other types of actuators may also be used, such as a stepper motor. In addition, the fluid within the sealed enclosure may be an oil as described above, or may be any other fluid that is capable of transmitting the forces between the actuator and the piston.

The embodiment shown and described with respect to FIGS. 1 and 2 illustrates a braking system that uses a pressurized fluid enclosure to counter the braking force generated by the biasing means. The use of the fluid enclosure provides a simple and effective means to remove the braking force, while permitting the braking force to be applied quickly if the need arises. The actuator shown in FIG. 1 defines a force applying means. An alternate embodiment of such a system, without an actuator, is illustrated schematically in FIG. 3.

Figure 3:
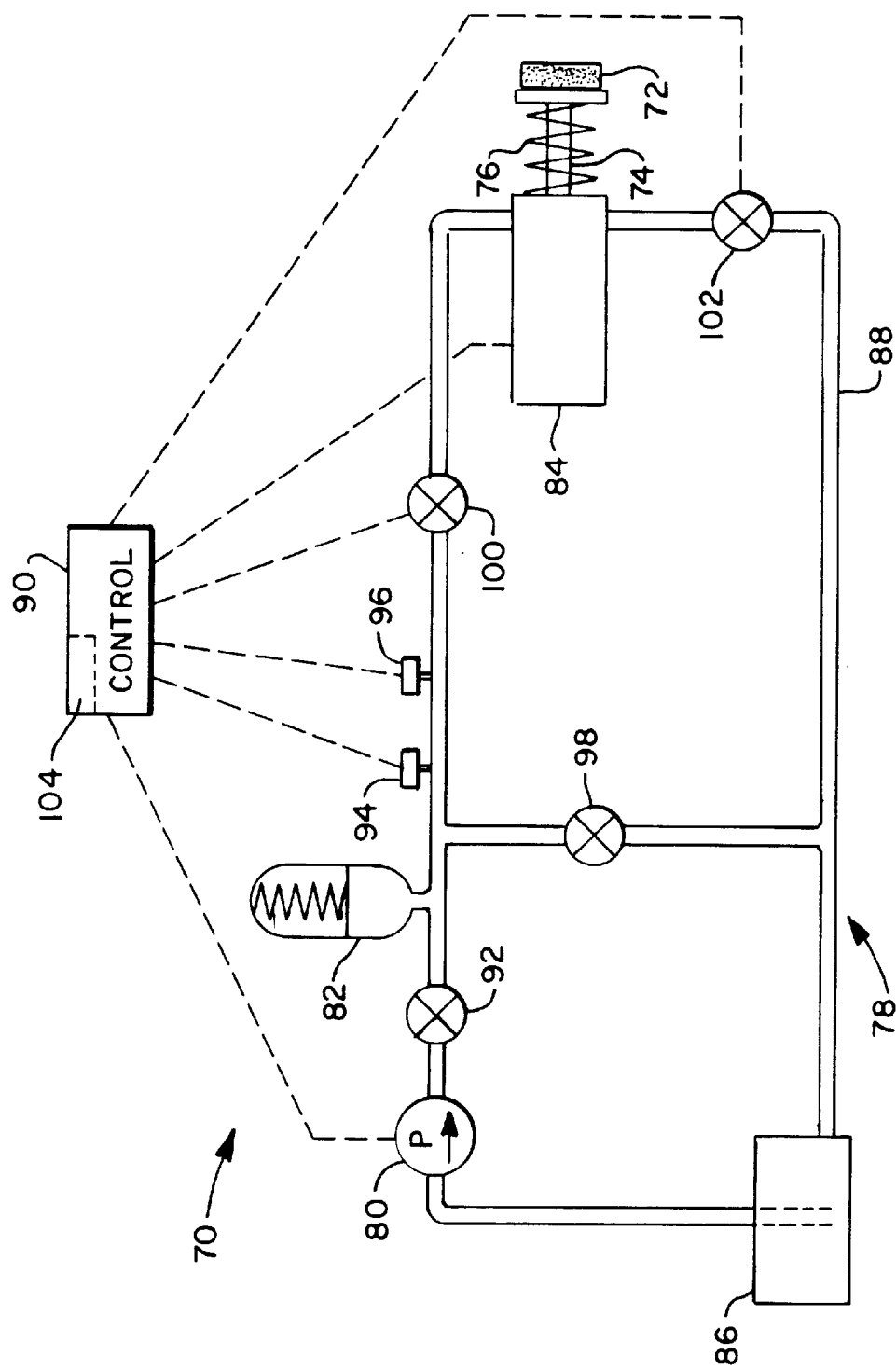
FIG. 3 is a schematic illustration of an alternate safety brake having a hydraulic system to counter the braking force.

As shown in FIG. 3, an elevator safety brake assembly 70 includes a brake pad 72, a piston 74 and a spring 76. The spring 76 is engaged with the piston 74 to urge the brake pad 72, disposed on the end of the piston 74, against the guide rail (not shown) in a similar fashion to the safety brake assembly described in FIG. 1. However, the embodiment shown in FIG. 3 includes a simple hydraulic system 78 to counter the brake force applied by the spring 76.

The hydraulic system 78 includes a pump 80, an accumulator 82, a fluid enclosure 84, a tank 86, a plurality of valves, a fluid communication system 88, and a controller 90. The pump 80 compresses fluid from the tank 86 and communicates the pressurized fluid to the accumulator 82 through a check valve 92. The accumulator 82 retains the pressurized fluid within a predetermined range of pressure through a pair of switches 94,96. The first switch 94 triggers the controller 90 if the pressure falls below a predetermined lower threshold and the second switch 96 triggers the controller 90 if the pressure exceeds a predetermined upper threshold. As a safety measure, a pressure relief valve 98 is disposed between the accumulator 82 and the tank 86 and operates to bleed excess pressure from the accumulator 82 and returns this fluid to the tank 86. An operation valve 100 is disposed between the accumulator 82 and the fluid enclosure 84. Opening of the operation valve 100 permits fluid to flow from the accumulator 82 to the fluid enclosure 84.

Pressurized fluid within the enclosure 84 urges the piston 74 to move against the force of the spring 76. In this way, the enclosure 84 defines a force applying means to urge the brake pad 72 away from the guide rail and the car (not shown) is permitted to move through the hoistway. In the event that it is desired to engage the brake pad 72 with the guide rail, a pressure relief valve 102 may be opened. Opening this valve 102 permits the fluid within the enclosure 84 to flow into the tank 86. As an additional safety measure, the maximum flow rate of the pressure relief valve 102 is greater than the maximum flow rate of the operation valve 100. As a result, with both valves 100,102 open the brake pad 72 will remain engaged with the guide rail.

During operation of the elevator system, the controller 90 receives inputs from the first and second switches 94,96 and from the fluid enclosure 84. The inputs from the first and second switches 94,96 provide information on status of the fluid within the accumulator 82 and the controller 90 determines whether or not to operate the pump 80. The input from the enclosure 84 provides information on the position of the piston 74.

In addition to the pump 80, the controller 90 also controls the operation of the operation valve 100 and the pressure relief valve 102. If the controller 90 determines that additional pressure is required within the enclosure 84 to move the piston 74 away from the guide rail, the controller 90 signals the operation valve 100 to open and permit fluid to flow into the enclosure 84 until the piston 74 is at the desired position. If the controller 90 determines that the brake pad 72 is required to be applied, the pressure relief valve 102 is opened, the pressure within the enclosure 84 drops and the spring 76 urges the piston 74 toward the guide rail.

Figure 4:
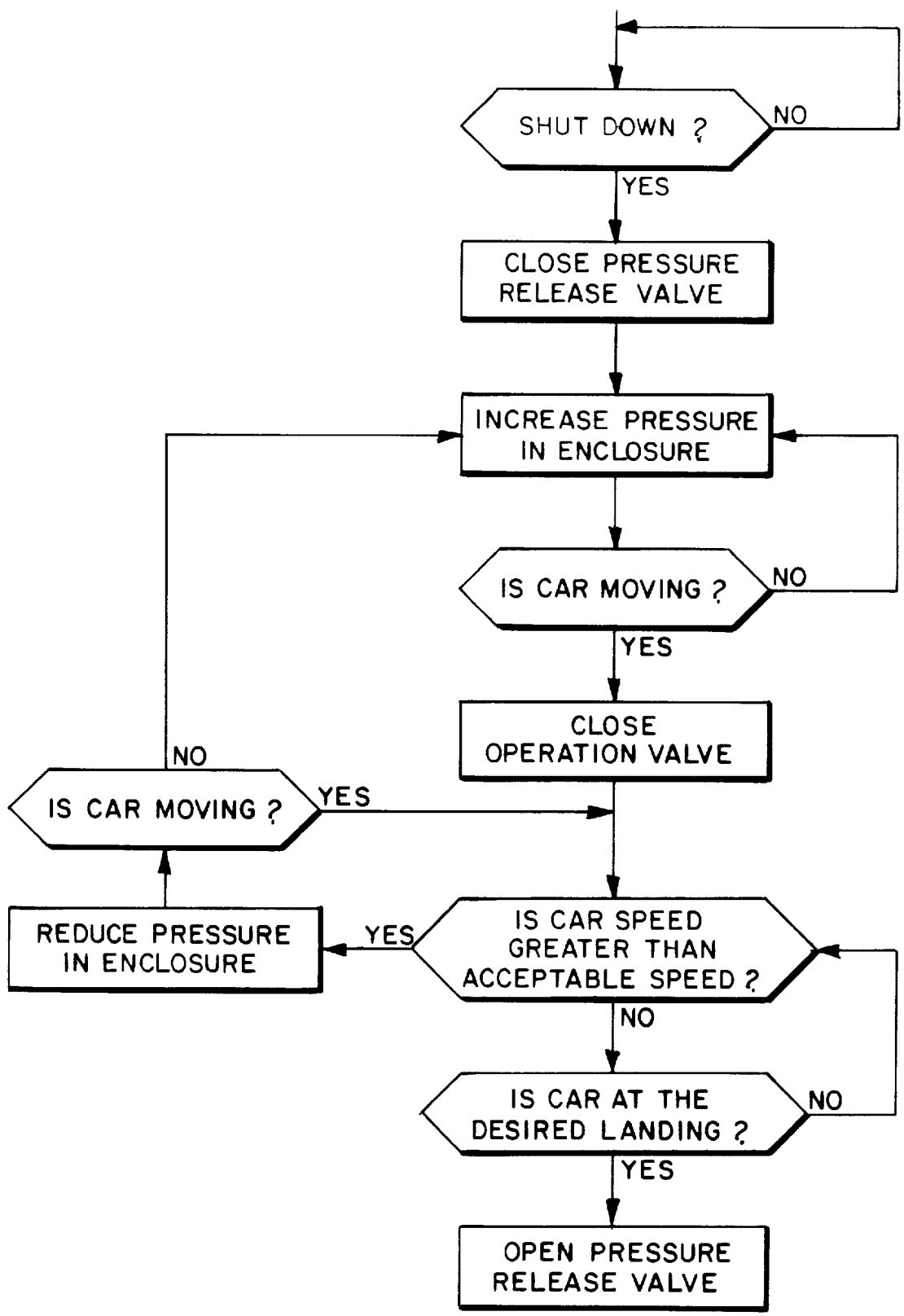
FIG. 4 is a functional flow diagram of a method to move an elevator car to a landing using the embodiment of FIG. 3.

In the event that it is desired to move the car after a shut-down of the elevator system has occurred, the operation valve 100 may be manually operated to transfer pressurized fluid from the accumulator 82 to the enclosure 84. Once the pressure within the enclosure 84 is high enough to permit the car to move, the operation valve 100 is closed and the position of the car within the hoistway is monitored. When the car is at the desired location or the speed is determined to be excessive, the pressure relief valve 102 may be manually operated to release the pressure within the enclosure 84 and bring the car to a stop or to slow the speed of the car. A functional flow diagram of this operation is illustrated in FIG. 4. As an alternative to manual operation of the valves 100,102, a back up power supply system 104 may be used to operate the controller 90 and the valves 100,102.

Although the invention has been shown and described with respect to exemplary embodiments thereof, it should be understood by those skilled in the art that various changes, omissions, and additions may be made thereto, without departing from the spirit and scope of the invention.

What is claimed is:

1. A brake for a passenger conveyor having a car, the brake providing means to stop the movement of the car the brake including:
   a braking surface disposed proximate to a complementary surface;
   biasing means engaged with the braking surface to apply a first force urging the braking surface toward the complementary surface;
   a fluid enclosure, wherein fluid pressure within the enclosure applies a second force urging the braking surface away from the complementary surface, and
   an actuator engaged with the fluid enclosure, wherein the fluid enclosure defines a fluid pressure amplifier disposed between the actuator and the braking surface to increase the magnitude of the force applied by the actuator to urge the braking surface away from the complementary surface.

2. The brake according to claim 1, wherein the braking surface is disposed on a piston including a flange, the flange having a wall with a surface area $A_1$, wherein, upon the application of sufficient force on the piston towards the complementary surface, the braking surface contacts the complementary surface to brake the car movement, and wherein the enclosure includes an inner surface defined in part by the flange wall, the enclosure including a branch, and wherein actuator includes a second flange having a wall with a surface area $A_2$, wherein $A_2<A_1$, the second flange wall defining in part the inner surface of the branch of the enclosure, and wherein movement of the actuator in a first direction applies a force against the first flange that urges the piston to move away from the complementary surface.

3. The brake according to claim 2, further including means to control the position of the actuator.

4. The brake according to claim 3, wherein the means to control the position of the actuator is an electromagnetic device having a coil, such that application of electrical energy to the coil causes the actuator to move in a direction that applies a force that opposes the force applied by the biasing means.

5. The brake according to claim 4, wherein the electrical energy supplied to the coil is variable such that the position of the actuator and the force applied by the actuator is variable.

6. The brake according to claim 5, further including a controller that defines the means to control the supply of energy to the coil, the controller receiving inputs that provide information on the car position, and wherein the controller positions the actuator to permit movement of the car until the car has reached a desired location.

7. The brake according to claim 6, wherein the controller further receives inputs on the position of the actuator and on car speed, and wherein the controller positions the actuator to limit the traveling speed of the car to less than a predetermined speed.

8. The brake according to claim 3, further including a controller that defines the means to control the position of the actuator, the controller receiving inputs that provide information on the car position, and wherein the controller positions the actuator to permit movement of the car until the car has reached a desired location.

9. The brake according to claim 8, wherein the controller further receives inputs on the position of the actuator and on car speed, and wherein the controller positions the actuator to limit the traveling speed of the car to less than a predetermined speed.

10. A safety brake for a passenger conveyor, the passenger conveyor having a car moving along a predetermined path defined by a guide rail, the safety brake providing means to stop the movement of the car along the path, the safety brake including:
    a frame;
    a piston disposed within the frame in a manner permitting motion of the piston relative to the frame, the piston including a flange and a braking surface, the flange having a wall with a surface area $A_1$, the braking surface being disposed proximate to the guide rail, and wherein, upon the application of sufficient force on the piston towards the guide rail, the braking surface contacts the guide rail to brake the car movement;
    biasing means engaged with the piston to apply sufficient force to urge the braking surface against the guide rail and to brake the car movement;
    a sealed enclosure containing a fluid, the enclosure including an inner surface defined in part by the flange wall, the enclosure including a branch; and
    an actuator including a second flange, the second flange having a wall with a surface area $A_2$, wherein $A_2<A_1$, the second flange wall defining in part the inner surface of the branch of the enclosure, wherein movement of the actuator in a first direction applies a force against the first flange that urges the piston to move away from the guide rail.

11. The safety brake according to claim 10, further including means to control the position of the actuator.

12. The safety brake according to claim 11, wherein the means to control the position of the actuator is an electromagnetic device having a coil, such that application of electrical energy to the coil causes the actuator to move in a direction that applies a force that opposes the force applied by the biasing means.

13. The safety brake according to claim 12, wherein the electrical energy supplied to the coil is variable such that the position of the actuator and the force applied by the actuator is variable.

14. The safety brake according to claim 13, further including a controller that defines the means to control the supply of energy to the coil, the controller receiving inputs that provide information on the car position, and wherein the controller positions the actuator to permit movement of the car until the car has reached a desired location.

15. The safety brake according to claim 14, wherein the controller further receives inputs on the position of the actuator and on car speed, and wherein the controller positions the actuator to limit the traveling speed of the car to less than a predetermined speed.

16. The safety brake according to claim 11, further including a controller that defines the means to control the position of the actuator, the controller receiving inputs that provide information on the car position, and wherein the controller positions the actuator to permit movement of the car until the car has reached a desired location.

17. The safety brake according to claim 16, wherein the controller further receives inputs on the position of the actuator and on car speed, and wherein the controller positions the actuator to limit the traveling speed of the car to less than a predetermined speed.

18. A safety brake for a passenger conveyor, the passenger conveyor having a car moving along a predetermined path defined by a guide rail, the safety brake providing means to stop the movement of the car along the path, the safety brake including:
 a braking surface disposed proximate to the guide rail;
 biasing means engaged with the braking surface to apply a first force urging the braking surface into contact with the guide rail;
 a controllable force applying means engaged with the braking surface to apply a second force urging the braking surface away from the guide rail, wherein the force applying means is an actuator; and
 a controller that defines the means to control the magnitude of the force applied by the force applying means, the controller receiving inputs from the passenger conveyor that provide information on the car position, wherein the controller defines means to control the position of the actuator, wherein the controller positions the actuator to permit movement of the car until the car has reached the desired location, wherein the controller further receives inputs on the position of the actuator and on car speed, and wherein the controller positions the actuator to limit the traveling speed of the car to less than a predetermined speed.

19. A safety brake for a passenger conveyor, the passenger conveyor having a car moving along a predetermined path defined by a guide rail, the safety brake providing means to stop the movement of the car along the path, the safety brake including:
 a braking surface disposed proximate to the guide rail;
 biasing means engaged with the braking surface to apply a first force urging the braking surface into the contact with the guide rail;
 a controllable force applying means engaged with the braking surface to apply a second force urging the braking surface away from the guide rail, wherein the force applying means is an actuator;
 a controller that defines the means to control the magnitude of the force applied by the force applying means, the controller receiving inputs from the passenger conveyor that provide information on the car position, and wherein the controller defines means to control the position of the actuator, and wherein the controller positions the actuator to permit movement of the car until the car has reached the desired location; and
 an electromagnetic device having a coil, such that application of electrical energy to the coil causes the actuator to move in a direction that applies a force that opposes the force applied by the biasing means.

20. The safety brake according to claim 19, wherein the electrical energy supplied to the coil is determined by the controller, and wherein the controller varies the supply of electrical energy to the coil such that the position of the actuator and the force applied by the actuator is variable.

21. A method to disengage a braking force from an elevator system, the elevator system including a car having a brake assembly, the brake assembly including a pair of complementary braking surfaces, biasing means engaged with the braking surfaces to apply a biasing force urging the braking surfaces together, and an actuator engaged with the braking surfaces to apply a second force urging the braking surfaces apart, the method including the steps of:
 providing a fluid pressure amplifier disposed between the actuator and the braking surfaces; and
 applying a force on the actuator sufficient to overcome the biasing force and to disengage the braking surfaces.

22. The method according to claim 21, wherein the brake assembly further includes a controllable actuator, and further including the step of varying the force on the actuator to control the speed and position of the car.

23. The method according to claim 22, wherein the brake assembly further includes an electromagnetic device having a coil, and wherein the controllable actuator is a core disposed within the coil, and wherein the step of varying the force on the actuator includes providing a voltage to the coil to induce a magnetic force on the actuator and varying the voltage on the coil to vary the force on the actuator.

24. The method according to claim 23, wherein the brake assembly further includes a control system that controls the voltage provided to the coil, the control system receiving information on the position and speed of the car, and further including the step of varying the voltage provided to the coil as a function of the car position and speed.

25. The method according to claim 21, wherein the fluid pressure amplifier includes a sealed enclosure containing a volume of fluid, and wherein the step of applying a force on the actuator includes the step of increasing the pressure within the sealed enclosure.

26. The method according to claim 25, wherein the sealed enclosure includes a first volume of fluid having a cross-sectional area A1, and a branch having a cross-sectional area A2, wherein A2<A1, wherein one of the braking surfaces is disposed on a piston engaged with the first volume of fluid, and wherein the step of applying a force on the actuator includes engaging the actuator with the branch to increase the pressure within the sealed enclosure.

27. A method to evacuate passengers from an elevator system in the event of a shut-down of the elevator system, the elevator system including a car, a brake assembly, a control system, and sensors to provide information on car speed and position, the brake assembly including brake surfaces, biasing means to apply a braking force on the brake surfaces, and a controllable force applying means that applies an opposing force on the brake surfaces, the method including the steps of:

sensing the occurrence of a shut-down of the elevator system;

increasing the force applied by the force applying means;

sensing the direction of movement of the car;

detecting the speed of the car, and reducing the force applied by the force applying means if the speed of the car exceeds a predetermined threshold; and decreasing the force applied by the force applying means when the car position is at a desired landing from which passengers may be evacuated from the car.

28. The method according to claim 27, wherein the force applying means is an controllable actuator, and wherein the step of increasing the force includes increasing the force on the controllable actuator, and wherein the step of decreasing the force includes decreasing the force on the controllable actuator.

29. The method according to claim 28, wherein the actuator is a core of an electromagnetic device having a coil, and wherein the step of increasing the force on the actuator includes increasing the voltage supplied to the coil, and wherein the step of removing the force on the actuator includes decreasing the voltage supplied to the coil.

30. The method according to claim 29, further including the step of reducing the voltage to the coil if the speed of the car exceeds a predetermined threshold.

31. The method according to claim 27, wherein the force applying means is a fluid enclosure, and wherein the step of increasing the force includes the step of increasing the fluid pressure within the enclosure, and wherein the step of decreasing the force includes the step of decreasing the pressure within the enclosure.

32. The method according to claim 31, further including the step of reducing the pressure within the enclosure if the speed of the car exceeds a predetermined threshold.

33. The method according to claim 27, wherein the control system further includes a back-up power supply system, the method further including the step of switching the control system to the back-up power supply system.

* * * * *